(12) United States Patent
Carter et al.

(10) Patent No.: US 10,983,997 B2
(45) Date of Patent: Apr. 20, 2021

(54) PATH QUERY EVALUATION IN GRAPH DATABASES

(71) Applicant: Microsoft Technology Licensing, LLC, Redmond, WA (US)

(72) Inventors: Andrew J. Carter, Mountain View, CA (US); Andrew Rodriguez, Palo Alto, CA (US); Scott M. Meyer, Berkeley, CA (US); Siddharth Shah, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 464 days.

(21) Appl. No.: 15/939,065

(22) Filed: Mar. 28, 2018

(65) Prior Publication Data
US 2019/0303478 A1 Oct. 3, 2019

(51) Int. Cl.
*G06F 16/2453* (2019.01)
*G06F 16/2455* (2019.01)
*G06F 16/901* (2019.01)

(52) U.S. Cl.
CPC .... *G06F 16/24542* (2019.01); *G06F 16/2456* (2019.01); *G06F 16/24565* (2019.01); *G06F 16/9024* (2019.01)

(58) Field of Classification Search
CPC ................................. G06F 16/24542
See application file for complete search history.

(56) References Cited

U.S. PATENT DOCUMENTS

| | | |
|---|---|---|
| 8,185,558 B1 | 5/2012 | Narayanan et al. |
| 8,533,182 B1 | 9/2013 | Charboneau |
| 8,736,612 B1 | 5/2014 | Goldman et al. |
| 9,330,138 B1 | 5/2016 | Shankar et al. |
| 9,378,303 B1 | 6/2016 | Shankar et al. |
| 2003/0084043 A1 | 5/2003 | Acharya et al. |
| 2007/0192306 A1 | 8/2007 | Papakonstantinou et al. |

(Continued)

FOREIGN PATENT DOCUMENTS

| | | |
|---|---|---|
| EP | 2937797 A1 | 10/2015 |
| WO | 2012091844 A1 | 7/2012 |

OTHER PUBLICATIONS

Dean; "Challenges in building large-scale information retrieval systems", Keynote of the 2nd ACM International Conference on Web Search and Data Mining (WSDM). 2009 http://videolectures.net/wsdm09_dean_cblirs/.

(Continued)

*Primary Examiner* — Van H Oberly
(74) *Attorney, Agent, or Firm* — Hickman Becker Bingham Ledesma LLP

(57) ABSTRACT

The disclosed embodiments provide a system for processing queries of a graph database. During operation, the system stores intermediate results of a query in a structure comprising rows in a set of tables. Next, the system applies one or more operations to existing rows in the structure to generate additional rows in additional tables of the structure. The system also tracks inputs and outputs associated with the one or more operations in a set of relationships between rows of different tables in the structure. Finally, the system uses the rows and the set of relationships to generate a final result of the query and provides the final result in a response to the query.

20 Claims, 7 Drawing Sheets

(56) References Cited

U.S. PATENT DOCUMENTS

| | | |
|---|---|---|
| 2007/0239694 A1 | 10/2007 | Singh et al. |
| 2008/0116449 A1 | 5/2008 | Macready et al. |
| 2008/0306910 A1 | 12/2008 | Singh |
| 2009/0132503 A1 | 5/2009 | Sun et al. |
| 2009/0240649 A1 | 9/2009 | Sereni et al. |
| 2009/0240682 A1 | 9/2009 | Balmin et al. |
| 2011/0270861 A1 | 11/2011 | Arshaysky et al. |
| 2012/0005224 A1 | 1/2012 | Ahrens et al. |
| 2012/0047114 A1 | 2/2012 | Duan et al. |
| 2012/0054129 A1 | 3/2012 | Aggarwal |
| 2012/0096043 A1 | 4/2012 | Stevens, Jr. |
| 2012/0136884 A1 | 5/2012 | Kanawa |
| 2012/0179644 A1 | 7/2012 | Miranker |
| 2012/0284255 A1 | 11/2012 | Schechter et al. |
| 2013/0097180 A1 | 4/2013 | Tseng |
| 2014/0172914 A1* | 6/2014 | Elnikety .............. G06F 16/9024 707/774 |
| 2014/0195564 A1 | 7/2014 | Talagala et al. |
| 2014/0201234 A1 | 7/2014 | Lee et al. |
| 2014/0280044 A1 | 9/2014 | Huynh et al. |
| 2014/0310302 A1 | 10/2014 | Wu et al. |
| 2014/0330867 A1 | 11/2014 | Sarkar et al. |
| 2014/0337373 A1 | 11/2014 | Morsi et al. |
| 2015/0026158 A1 | 1/2015 | Jin |
| 2015/0120717 A1 | 4/2015 | Kim et al. |
| 2015/0120775 A1 | 4/2015 | Shao et al. |
| 2015/0127677 A1 | 5/2015 | Wang et al. |
| 2015/0134637 A1 | 5/2015 | Pall et al. |
| 2015/0302300 A1 | 10/2015 | Fletcher et al. |
| 2016/0171540 A1 | 6/2016 | Mangipudi et al. |
| 2018/0144061 A1 | 5/2018 | Rodriguez et al. |
| 2020/0201909 A1* | 6/2020 | Das .................... G06F 16/9024 |

OTHER PUBLICATIONS

Wikipedia: "Delta Encoding", The Free Encyclopedia. Accessed at https://en.wikipedia.org/wiki/Delta_encoding Apr. 10, 2017.

Koszewnik; "The Netflix Tech Blog: NefflixGraph Metadata Library: An Optimization Case Study", Jan. 18, 2013, XP055362100, retrieved from the Internet: URL: http://techblog.netflix.com/2013/001/netflixgraph-metadata-library_18.html.

Blandford et al.; "An Experimental Analysis of a Compact Graph Representation", Workshop on Algorithms Engineering and Experiments (ALENEX), Jan. 1, 2004, XP0055177526.

Stepanov et al.; "SIMD-Based Decoding of Posting Lists", Proceedings of the 20th ACM Conference on Information and Knowledge Management, XP002759898, retrieved from the internet: URL: http://www.stepanovpapers.com/CIKM_2011.pdf, Oct. 24-28, 2011.

Lemire et al.; "Decoding Billions of Integers Per Second Through Vectorization", Software Practice & Experience, vol. 45, No. 1, Jan. 1, 2015, XP055363887, pp. 1-29.

Ousterhout et al.; "The RAMCloud Storage System", ACM Transactions on Computer Systems, vol. 33, No. 3, Article 7, Published Aug. 31, 2015.

Shao et al.; "Trinity: A Distributed Graph Engine on a Memory Cloud", Proceedings of the 2013 International Conference on Management of Data, SIGMOD, Jun. 22, 2013, XP055396688.

International Search Report and Written Opinion from PCT International Application No. PCT/US2016/068119, dated Aug. 9, 2017, Authorized officer Sommermeyer, Katrin, EPO.

"Non Final Office Action Issued in U.S. Appl. No. 15/360,605", dated Oct. 17, 2018, 19 Pages.

* cited by examiner

PATH QUERY EVALUATION IN GRAPH DATABASES

RELATED APPLICATION

The subject matter of this application is related to the subject matter in a co-pending non-provisional application by inventors Andrew Rodriguez, Andrew Carter, Scott Meyer and Srinath Shankar, entitled "Edge Store Designs for Graph Databases," having Ser. No. 15/360,605 and filing date 23 Nov. 2016.

BACKGROUND

Field

The disclosed embodiments relate to graph databases. More specifically, the disclosed embodiments relate to techniques for performing path query evaluation in graph databases.

Related Art

Data associated with applications is often organized and stored in databases. For example, in a relational database data is organized based on a relational model into one or more tables of rows and columns, in which the rows represent instances of types of data entities and the columns represent associated values. Information can be extracted from a relational database using queries expressed in a Structured Query Language (SQL).

In principle, by linking or associating the rows in different tables, complicated relationships can be represented in a relational database. In practice, extracting such complicated relationships usually entails performing a set of queries and then determining the intersection of the results or joining the results. In general, by leveraging knowledge of the underlying relational model, the set of queries can be identified and then performed in an optimal manner.

However, applications often do not know the relational model in a relational database. Instead, from an application perspective, data is usually viewed as a hierarchy of objects in memory with associated pointers. Consequently, many applications generate queries in a piecemeal manner, which can make it difficult to identify or perform a set of queries on a relational database in an optimal manner. This can degrade performance and the user experience when using applications.

Various approaches have been used in an attempt to address this problem, including using an object-relational mapper, so that an application effectively has an understanding or knowledge about the relational model in a relational database. However, it is often difficult to generate and to maintain the object-relational mapper, especially for large, real-time applications.

Alternatively, a key-value store (such as a NoSQL database) may be used instead of a relational database. A key-value store may include a collection of objects or records and associated fields with values of the records. Data in a key-value store may be stored or retrieved using a key that uniquely identifies a record. By avoiding the use of a predefined relational model, a key-value store may allow applications to access data as objects in memory with associated pointers (i.e., in a manner consistent with the application's perspective). However, the absence of a relational model means that it can be difficult to optimize a key-value store. Consequently, it can also be difficult to extract complicated relationships from a key-value store (e.g., it may require multiple queries), which can also degrade performance and the user experience when using applications.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

Figure 1:
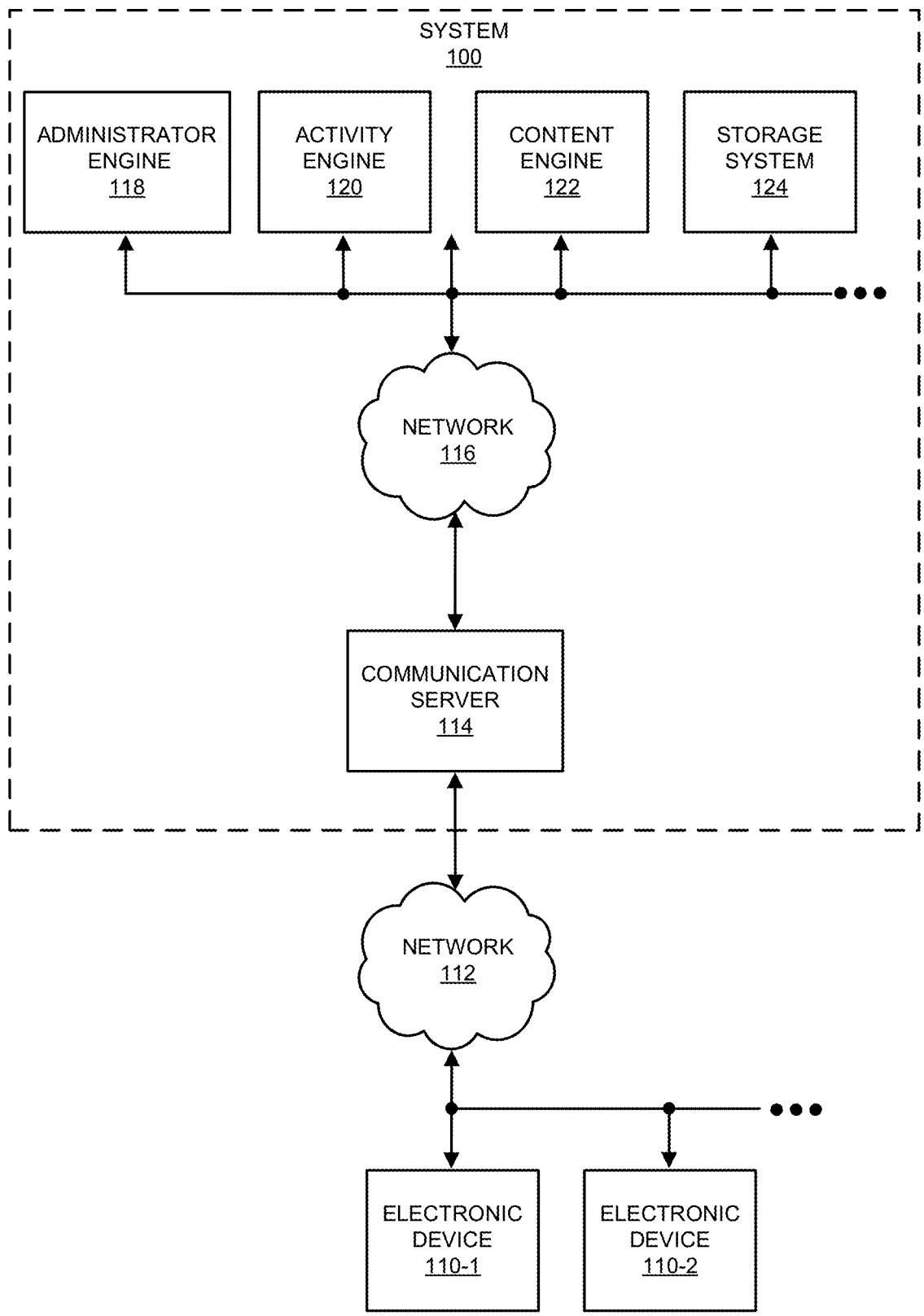
FIG. 1 shows a schematic of a system in accordance with the disclosed embodiments.

The disclosed embodiments provide a method, apparatus and system for processing queries of a graph database. A system 100 for performing a technique described herein is shown in FIG. 1. In this system, users of electronic devices 110 may use a service that is, at least in part, provided using one or more software products or applications executing in system 100. As described further below, the applications may be executed by engines in system 100.

Moreover, the service may, at least in part, be provided using instances of a software application that is resident on and that executes on electronic devices 110. In some implementations, the users may interact with a web page that is provided by communication server 114 via network 112, and which is rendered by web browsers on electronic devices 110. For example, at least a portion of the software application executing on electronic devices 110 may be an application tool that is embedded in the web page and that executes in a virtual environment of the web browsers. Thus, the application tool may be provided to the users via a client-server architecture.

The software application operated by the users may be a standalone application or a portion of another application that is resident on and that executes on electronic devices 110 (such as a software application that is provided by communication server 114 or that is installed on and that executes on electronic devices 110).

A wide variety of services may be provided using system 100. In the discussion that follows, a social network (and, more generally, a network of users), such as an online professional network, which facilitates interactions among the users, is used as an illustrative example. Moreover, using one of electronic devices 110 (such as electronic device 110-1) as an illustrative example, a user of an electronic device may use the software application and one or more of the applications executed by engines in system 100 to interact with other users in the social network. For example, administrator engine 118 may handle user accounts and user profiles, activity engine 120 may track and aggregate user behaviors over time in the social network, content engine 122 may receive user-provided content (audio, video, text, graphics, multimedia content, verbal, written, and/or recorded information) and may provide documents (such as presentations, spreadsheets, word-processing documents, web pages, etc.) to users, and storage system 124 may maintain data structures in a computer-readable memory that may encompass multiple devices (e.g., a large-scale distributed storage system).

Note that each of the users of the social network may have an associated user profile that includes personal and professional characteristics and experiences, which are sometimes collectively referred to as 'attributes' or 'characteristics.' For example, a user profile may include demographic information (such as age and gender), geographic location, work industry for a current employer, an employment start date, an optional employment end date, a functional area (e.g., engineering, sales, consulting), seniority in an organization, employer size, education (such as schools attended and degrees earned), employment history (such as previous employers and the current employer), professional development, interest segments, groups that the user is affiliated with or that the user tracks or follows, a job title, additional professional attributes (such as skills), and/or inferred attributes (which may include or be based on user behaviors). Moreover, user behaviors may include log-in frequencies, search frequencies, search topics, browsing certain web pages, locations (such as IP addresses) associated with the users, advertising or recommendations presented to the users, user responses to the advertising or recommendations, likes or shares exchanged by the users, interest segments for the likes or shares, and/or a history of user activities when using the social network. Furthermore, the interactions among the users may help define a social graph in which nodes correspond to the users and edges between the nodes correspond to the users' interactions, interrelationships, and/or connections. However, as described further below, the nodes in the graph stored in the graph database may correspond to additional or different information than the members of the social network (such as users, companies, etc.). For example, the nodes may correspond to attributes, properties or characteristics of the users.

As noted previously, it may be difficult for the applications to store and retrieve data in existing databases in storage system 124 because the applications may not have access to the relational model associated with a particular relational database (which is sometimes referred to as an 'object-relational impedance mismatch'). Moreover, if the applications treat a relational database or key-value store as a hierarchy of objects in memory with associated pointers, queries executed against the existing databases may not be performed in an optimal manner. For example, when an application requests data associated with a complicated relationship (which may involve two or more edges, and which is sometimes referred to as a 'compound relationship'), a set of queries may be performed and then the results may be linked or joined. To illustrate this problem, rendering a web page for a blog may involve a first query for the three-most-recent blog posts, a second query for any associated comments, and a third query for information regarding the authors of the comments. Because the set of queries may be suboptimal, obtaining the results may be time-consuming. This degraded performance may, in turn, degrade the user experience when using the applications and/or the social network.

To address these problems, storage system 124 includes a graph database that stores a graph (e.g., as part of an information-storage-and-retrieval system or engine). Note that the graph may allow an arbitrarily accurate data model to be obtained for data that involves fast joining (such as for a complicated relationship with skew or large 'fan-out' in storage system 124), which approximates the speed of a pointer to a memory location (and thus may be well suited to the approach used by applications).

Figure 2:
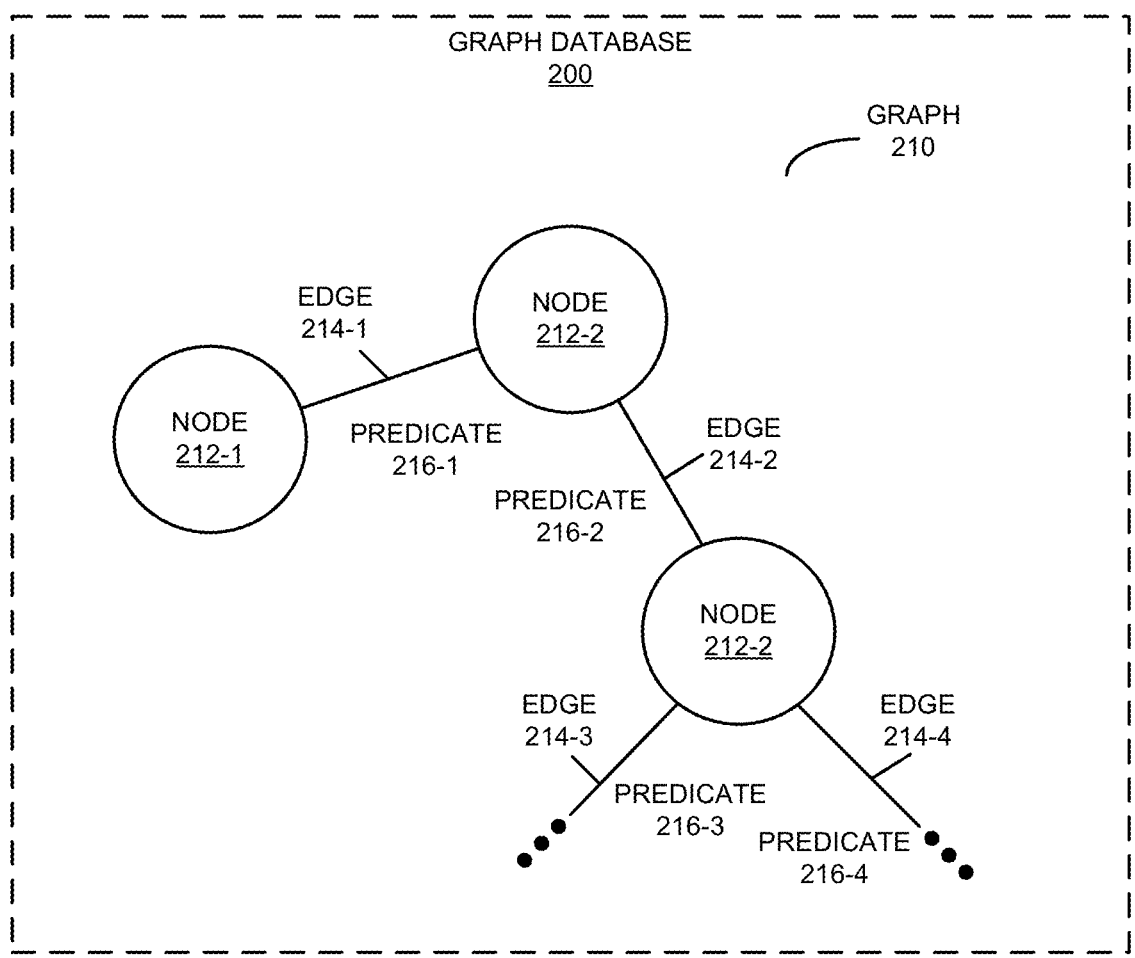
FIG. 2 shows a graph in a graph database in accordance with the disclosed embodiments.

FIG. 2 presents a block diagram illustrating a graph 210 stored in a graph database 200 in system 100 (FIG. 1). Graph 210 includes nodes 212, edges 214 between nodes 212, and predicates 216 (which are primary keys that specify or label edges 214) to represent and store the data with index-free adjacency, so that each node 212 in graph 210 includes a direct edge to its adjacent nodes without using an index lookup.

Note that graph database 200 may be an implementation of a relational model with constant-time navigation (i.e., independent of the size N), as opposed to varying as log(N). Moreover, all the relationships in graph database 200 may be first class (i.e., equal). In contrast, in a relational database, rows in a table may be first class, but a relationship that involves joining tables may be second class. Furthermore, a schema change in graph database 200 (such as the equivalent to adding or deleting a column in a relational database) may be performed with constant time (in a relational database, changing the schema can be problematic because it is often embedded in associated applications). Additionally, for graph database 200, the result of a query may be a subset of graph 210 that maintains the structure (i.e., nodes, edges) of the subset of graph 210.

The graph-storage technique may include methods that allow the data associated with the applications and/or the social network to be efficiently stored and retrieved from graph database 200. Such methods are described in U.S. Pat. No. 9,535,963 (issued 3 Jan. 2017), by inventors Srinath Shankar, Rob Stephenson, Andrew Carter, Maverick Lee and Scott Meyer, entitled "Graph-Based Queries," which is incorporated herein by reference.

Referring back to FIG. 1, the graph-storage techniques described herein may allow system 100 to efficiently and quickly (e.g., optimally) store and retrieve data associated with the applications and the social network without requiring the applications to have knowledge of a relational model implemented in graph database 200. Consequently, the graph-storage techniques may provide technological improvements in the availability and the performance or functioning of the applications, the social network and system 100, which may reduce user frustration and which may improve the user experience. The graph-storage techniques may additionally increase engagement with or use of the social network, and thus may increase the revenue of a provider of the social network.

Note that information in system 100 may be stored at one or more locations (i.e., locally and/or remotely). Moreover, because this data may be sensitive in nature, it may be encrypted. For example, stored data and/or data communicated via networks 112 and/or 116 may be encrypted.

In one or more embodiments, graph database 200 includes functionality to declaratively evaluate path queries using a data structure, a set of operations, and a set of constraints. In these embodiments, a path query represents a query that describes a path between two nodes 212 in graph 210. During declarative evaluation, two queries that return the same result are executed by graph database 200 in the same or substantially identical ways.

Figure 3:
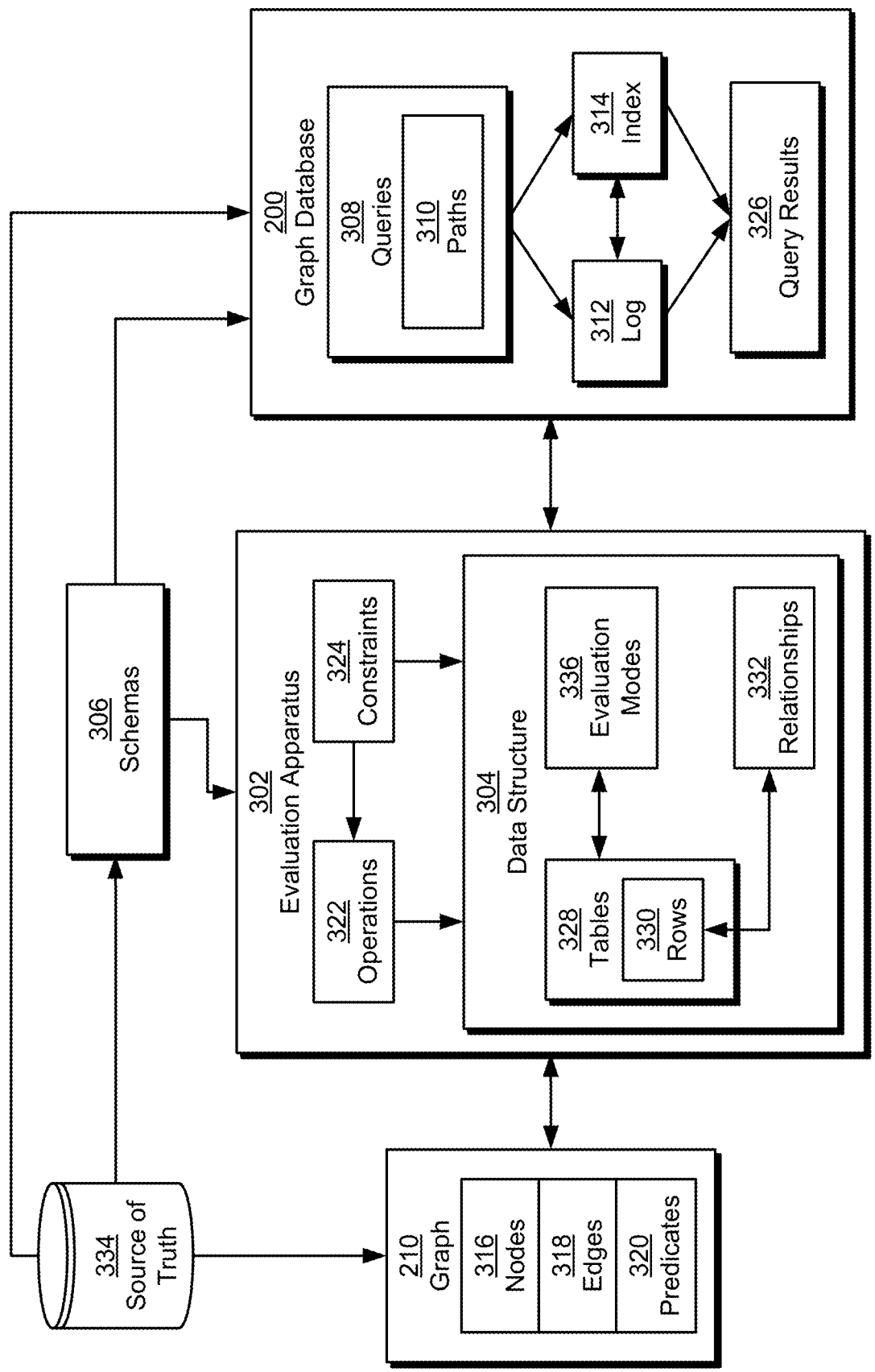
FIG. 3 shows a system for processing queries of a graph database in accordance with the disclosed embodiments.

As shown in FIG. 3, graph 210 and one or more schemas 306 associated with graph 210 are obtained from a source of truth 334 for graph database 200. For example, graph 210 and schemas 306 may be retrieved from a relational database, distributed filesystem, and/or other storage mechanism providing the source of truth.

As mentioned above, graph 210 includes a set of nodes 316, a set of edges 318 between pairs of nodes, and a set of predicates 320 describing the nodes and/or edges. Each edge in graph 210 may be specified in a (subject, predicate, object) triple. For example, an edge denoting a connection between two members named "Alice" and "Bob" may be specified using the following statement:

Edge("Alice", "ConnectedTo", "Bob").

In the above statement, "Alice" is the subject, "Bob" is the object, and "ConnectedTo" is the predicate. A period following the "Edge" statement may denote an assertion that is used to write the edge to graph database 200. Conversely, the period may be replaced with a question mark to read any edges that match the subject, predicate, and object from the graph database:

Edge("Alice", "ConnectedTo", "Bob")?

Moreover, a subsequent statement may modify the initial statement with a tilde to indicate deletion of the edge from graph database 200:

Edge~("Alice", "ConnectedTo", "Bob").

In addition, specific types of edges and/or complex relationships in graph 210 may be defined using schemas 306. Continuing with the previous example, a schema for employment of a member at a position within a company may be defined using the following:

```
DefPred("employ/company", "1", "node", "0", "node").
DefPred("employ/member", "1", " node", "0", "node").
DefPred("employ/start", "1", "node", "0", "date").
DefPred("employ/end_date", "1", "node", "0",
    "date").
M2C@(e, memberId, companyId, start, end) :-
    Edge(e, "employ/member", memberId),
    Edge(e, "employ/company", companyId),
    Edge(e, "employ/start", start),
    Edge(e, "employ/end_date", end)
```

In the above schema, a compound structure for the employment is denoted by the "@" symbol and has a compound type of "M2C." The compound is also represented by four predicates and followed by a rule with four edges that use the predicates. The predicates include a first predicate representing the employment at the company (e.g., "employ/company"), a second predicate representing employment of the member (e.g., "employ/member"), a third predicate representing a start date of the employment (e.g., "employ/start"), and a fourth predicate representing an end date of the employment (e.g., "employ/end_date"). Each predicate is defined using a corresponding "DefPred" call; the first argument to the call represents the name of the predicate, the second argument of the call represents the cardinality of the object associated with the edge, the third argument of the call represents the type of subject associated with the edge, the fourth argument represents the cardinality of the object associated with the edge, and the fifth argument represents the type of object associated with the edge.

In the rule, the first edge uses the second predicate to specify employment of a member represented by "memberId," and the second edge uses the first predicate to specify employment at a company represented by "companyId." The third edge of the rule uses the third predicate to specify a "start" date of the employment, and the fourth edge of the rule uses the fourth predicate to specify an "end" date of the employment. All four edges share a common subject denoted by "e," which functions as a hub node that links the edges to form the compound relationship.

In another example, a compound relationship representing endorsement of a skill in an online professional network may include the following schema:

```
DefPred("endorser", "1", "node", "0", "node").
DefPred("endorsee", "1", " node", "0", "node").
DefPred("skill", "1", "node", "0", "node").
Endorsement@(h, Endorser, Endorsee, Skill) :-
    Edge(h, "endorser", Endorser),
    Edge(h, "endorsee", Endorsee),
    Edge(h, "skill", Skill).
```

In the above schema, the compound relationship is declared using the "@" symbol and specifies "Endorsement" as a compound type (i.e., data type) for the compound relationship. The compound relationship is represented by three predicates defined as "endorser," "endorsee," and "skill." The "endorser" predicate may represent a member making the endorsement, the "endorsee" predicate may represent a member receiving the endorsement, and the "skill" predicate may represent the skill for which the endorsement is given. The declaration is followed by a rule that maps the three predicates to three edges. The first edge uses the first predicate to identify the endorser as the value specified in an "Endorser" parameter, the second edge uses the second predicate identify the endorsee as the value specified in an "Endorsee" parameter, and the third edge uses the third predicate to specify the skill as the value specified in a "Skill" parameter. All three edges share a common subject denoted by "h," which functions as a hub node that links the edges to form the compound relationship. Consequently, the schema may declare a trinary relationship for an "Endorsement" compound type, with the relationship defined by identity-giving attributes with types of "endorser," "endorsee," and "skill" and values attached to the corresponding predicates.

Compounds stored in graph database 200 may model complex relationships (e.g., employment of a member at a position within a company) using a set of basic types (i.e., binary edges 318) in graph database 200. More specifically, each compound may represent an n-ary relationship in graph 210, with each "component" of the relationship identified using the predicate and object (or subject) of an edge. A set of "n" edges that model the relationship may then be linked to the compound using a common subject (or object) that is set to a hub node representing the compound. In turn, new compounds may dynamically be added to graph database 200 without changing the basic types used in graph database 200, by specifying relationships that relate the compound structures to the basic types in schemas 306.

Graph 210 and schemas 306 are used to populate graph database 200 for processing queries 308 against the graph. More specifically, a representation of nodes 316, edges 318, and predicates 320 may be obtained from source of truth 334 and stored in a log 312 in the graph database. Lock-free access to graph database 200 may be implemented by appending changes to graph 210 to the end of the log instead of requiring modification of existing records in the source of truth. In turn, graph database 200 may provide an in-memory cache of log 312 and an index 314 for efficient and/or flexible querying of the graph.

Nodes 316, edges 318, and predicates 320 may be stored as offsets in log 312. For example, the exemplary edge statement for creating a connection between two members named "Alice" and "Bob" may be stored in a binary log 312 using the following format:
  256 Alice
  261 Bob
  264 ConnectedTo
  275 (256, 264, 261)
In the above format, each entry in the log is prefaced by a numeric (e.g., integer) offset representing the number of bytes separating the entry from the beginning of the log. The first entry of "Alice" has an offset of 256, the second entry of "Bob" has an offset of 261, and the third entry of "ConnectedTo" has an offset of 264. The fourth entry has an offset of 275 and stores the connection between "Alice" and "Bob" as the offsets of the previous three entries in the order in which the corresponding fields are specified in the statement used to create the connection (i.e., Edge("Alice", "ConnectedTo", "Bob")).

Because the ordering of changes to graph 210 is preserved in log 312, offsets in log 312 may be used as representations of virtual time in graph 210. More specifically, each offset may represent a different virtual time in graph 210, and changes in the log up to the offset may be used to establish a state of graph 210 at the virtual time. For example, the sequence of changes from the beginning of log 312 up to a given offset that is greater than 0 may be applied, in the order in which the changes were written, to construct a representation of graph 210 at the virtual time represented by the offset.

Graph database 200 also includes an in-memory index 314 that enables efficient lookup of edges 318 by subject, predicate, object, and/or other keys or parameters 310. The index structure may include a hash map and an edge store. Entries in the hash map may be accessed using keys such as subjects, predicates, and/or objects that partially define edges in the graph. In turn, the entries may include offsets into the edge store that are used to resolve and/or retrieve the corresponding edges. Edge store designs for graph database indexes are described in a co-pending non-provisional application by inventors Andrew Rodriguez, Andrew Carter, Scott Meyer and Srinath Shankar, entitled "Edge Store Designs for Graph Databases," having Ser. No. 15/360,605, and filing date 23 Nov. 2016, which is incorporated herein by reference.

As mentioned above, the system of FIG. 3 uses a data structure 304, a set of operations 322, and a set of constraints 324 to evaluate graph database 200 queries 308 that contain paths 310. A path may include one or more hops between two nodes 316 in graph 210; in other words, the path may be defined by a sequence of edges 318 and/or additional nodes 316 in graph 210 that connect the two nodes. In turn, the path may be used to calculate a result of a query and/or may be included in the result.

Paths 310 may also, or instead, refer to execution paths that are used to generate intermediate and/or final query results 326 of queries 308. That is, paths 310 within data structure 304 may be used to track inputs, outputs, and/or operations 322 that are used to produce query results 326.

In one or more embodiments, data structure 304 includes a set of rows 330 in a set of tables 328, with rows in different tables connected via one-to-one and/or one-to-many relationships 332. An evaluation apparatus 302 in or associated with graph database 200 stores intermediate and/or final results of queries 308 in tables 328 of data structure 304. For example, each table in data structure 304 may include rows 330 containing data related to an individual step involved in processing a query of graph database 200.

As a result, data structure 304 may provide a more compact representation of intermediate results of queries 308 than a conventional query-evaluation technique that stores and/or returns a result of a query in a single table. For example, a query that calculates a second-degree network of a member may first retrieve a list of members representing the member's first-degree connections, and then retrieve the first-degree connections of each member in the list. If the member has X first-degree connections and Y second-degree connections, a single table storing the result of the query may require up to X*Y rows representing all possible combinations of the member's first- and second-degree connections. Conversely, storing first-degree and second-degree connections in separate tables 328 (e.g., in data structure 304) may require only X+Y rows representing individual first- or second-degree connections of the member.

During processing of a query, evaluation apparatus 302 applies a set of basic operations 322 to rows 330 of source tables in data structure 304 to generate output that is stored in destination tables of data structure 304. Additional operations 322 may then be applied to data in existing tables to generate output that is stored in additional tables of data structure 304. Thus, evaluation of the path query may proceed sequentially using a series of tables 328 and relationships 332 that link a row of a given table to one or more rows in another table that are generated using the row.

More specifically, a given operation may be applied to one or more rows 330 of a source table to generate output that is stored in one or more rows 330 of a destination table. Additional operations 322 may continue to be applied to existing tables 328 to generate additional tables 328 in data structure 304 until a final result of the query is produced. In turn, directional relationships 332 connecting input and output rows 330 in tables 328 may be used to form one or more paths 310 within data structure 304 that are used to determine the final result of the query, with a given path deemed to be valid when all rows along the path are valid.

For example, an operation may be applied to four rows 330 of a source table to generate a total of 12 rows in a destination table, with the first row of the source table producing three rows in the destination table, the second row of the source table producing five rows in the destination table, the third row of the source table producing zero rows in the destination tables, and the fourth row of the source table producing four rows in the destination table. Relationships 332 between rows 330 of the source and destination tables may be tracked using an array that stores offsets representing the ranges of rows in the destination table produced from rows in the source table, or [0, 3, 8, 8, 12]. A given range of destination rows for the kth source row may be obtained from indexes k and k+1 in the array. Conversely, a given destination row may be matched to a source row using a binary search technique.

In one or more embodiments, operations 322 used with data structure 304 to evaluate path queries 308 include an expand operation, a reduce operation, a zip operation, an unzip operation, and a join operation. The expand operation expands one row in table of data structure 304 into multiple rows in another table of data structure 304. For example, evaluation apparatus 302 may apply the expand operation to an input row of a source table containing a member identifier to identify a set of first-degree connections for a member represented by the member identifier. Evaluation apparatus 302 may then store the first-degree connections in a set of output rows 330 of a destination table in data structure 304 and connect the input and output rows with one or more relationships 332.

Figure 4A:
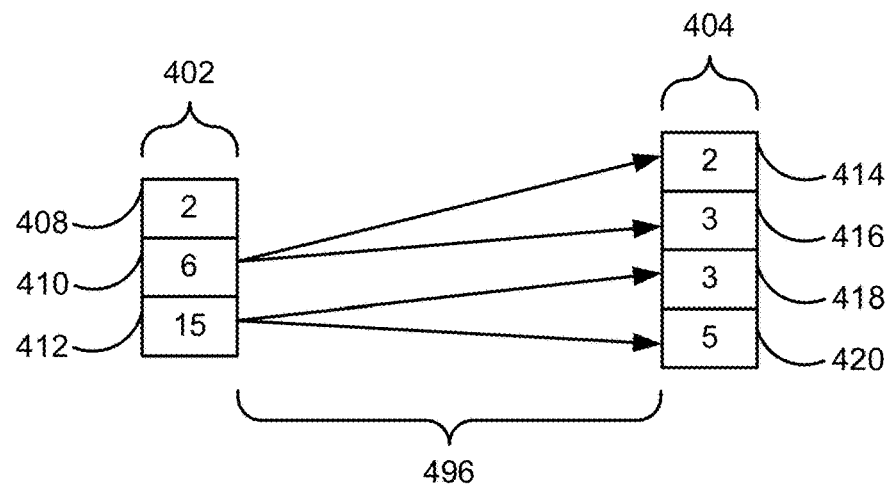
FIG. 4A shows an exemplary operation used in processing a path query of a graph database in accordance with the disclosed embodiments.

As shown in FIG. 4A, an exemplary expand operation is applied to three rows 408-412 of an input table 402 to produce four rows 414-420 of an output table 404. In particular, the exemplary expand operation may calculate a set of proper factors from values of 2, 6, and 15 in rows 408-412. As a result, output rows 414-416 store proper factors of 2 and 3 for the input value of 6 in row 410, and output rows 418-420 store proper factors of 3 and 5 for the input value of 15 in row 412. Because the input value of 2 in row 408 does not have any proper factors, table 404 does not include any output rows for row 408.

The exemplary expand operation also tracks relationships 496 between data in rows 408-412 of input table 402 and data in rows 414-420 in output table 404. For example, relationships 496 may include two directed edges from row 410 to rows 414 and 416, and two directed edges from row 412 to rows 418 and 420. Consequently, relationships 496 may identify which rows 408-412 in table 402 are used by the expand operation to generate rows 414-420 in table 404.

The reduce operation aggregates multiple rows from one or more tables of data structure 304 into a single row in another table of data structure 304. For example, the reduce operation may be used to generate a sum, count, average, ratio, median, minimum, maximum, percentile, and/or other statistic or metric from a set of rows in one table, which are in turn generated from one row in another table.

Figure 4B:
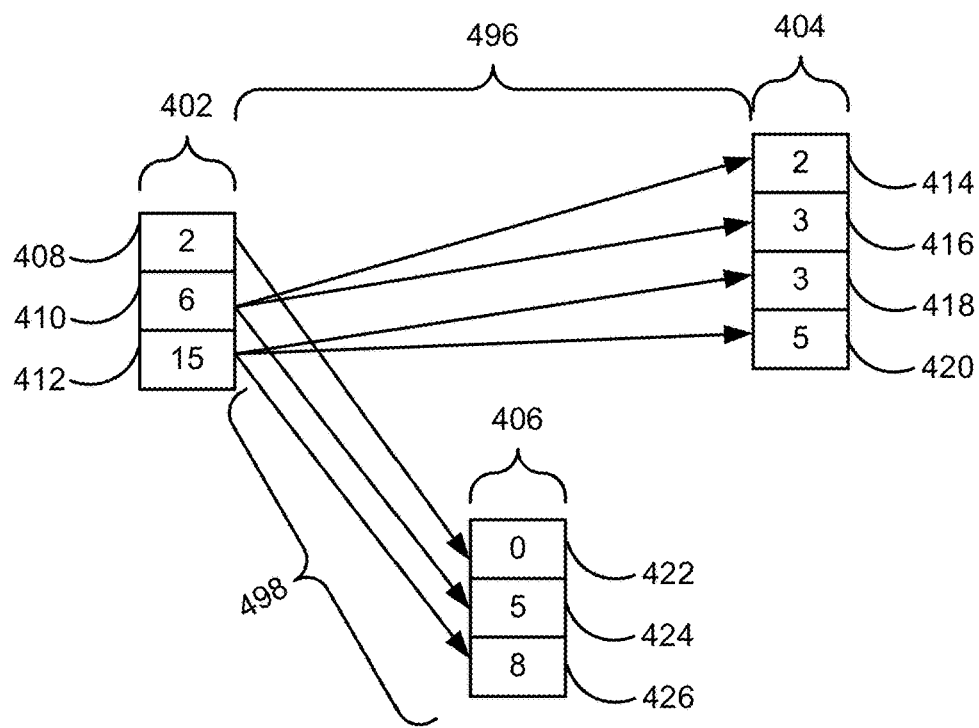
FIG. 4B shows an exemplary operation used in processing a path query of a graph database in accordance with the disclosed embodiments.

As shown in FIG. 4B, an exemplary reduce operation is used with the exemplary expand operation of FIG. 4A to produce a third table 406 from the contents of table 402 and/or table 404. More specifically, the exemplary reduce operation may sum the proper factors generated from three rows 408-412 of table 402 and store the sums in three corresponding rows 422-426 of table 406. Thus, the input value of 2 in row 408 has an output value of 0 in row 422 (because 2 has zero proper factors), the input value of 6 in row 410 has an output value of 5 in row 424 (by summing the values of 2 and 3 in rows 414 and 416), and the input value of 15 in row 412 has an output value of 8 in row 426 (by summing the values of 3 and 5 in rows 418 and 420). A set of relationships 498 between tables 402 and 406 may track the generation of row 422 from row 408, the generation of row 424 from row 410, and the generation of row 426 from row 412.

The zip operation accepts two sets of source rows and produces a cross product of the source rows. The source rows may additionally be identified by a relationship to a common attribute (e.g., a subject, predicate, and/or object).

Figure 4C:
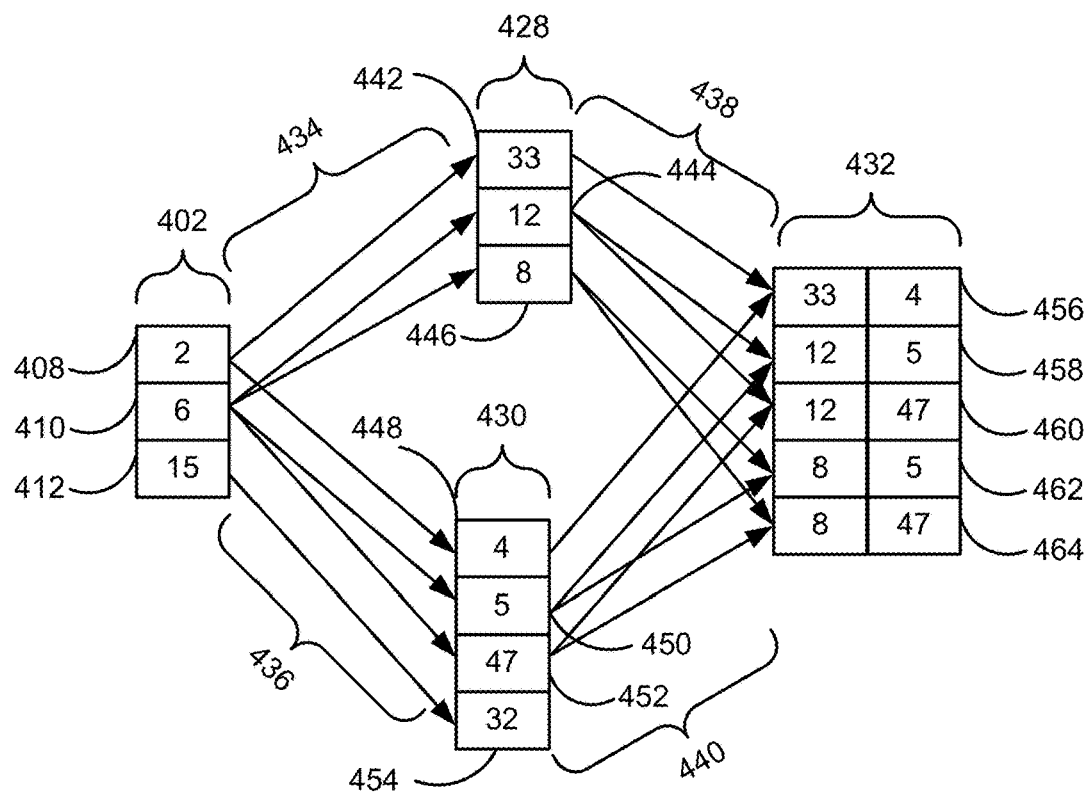
FIG. 4C shows an exemplary operation used in processing a path query of a graph database in accordance with the disclosed embodiments.

As shown in FIG. 4C, an exemplary zip operation is applied to rows 442-454 of two intermediate tables 428-430 to produce an output table 432. Rows 456-464 in output table 432 contain cross products of rows 442-446 in table 428 and rows 448-454 in table 430. The cross products are further generated based on relationships 434 between rows 442-446 in table 428 and rows 408-412 of source table 402, as well as an additional set of relationships 436 between rows 448-454 in table 430 and rows 408-412 of source table 402.

In particular, relationships 434 indicate that within table 428, row 442 is generated from row 408 and rows 444-446 are generated from row 410. Relationships 436 indicate that, within table 430, row 448 is generated from row 408, rows 450-452 are generated from row 410, and row 454 is generated from row 412.

As a result, table 432 may store cross products of rows 442-454 in tables 428 and 430 that come from the same source row in table 402. Row 456 in table 432 contains the cross product of row 442 and row 448 since both rows 442 and 448 have the same original source row 408 in table 402. Similarly, rows 458-464 in table 432 contain the cross product of rows 444-446 and rows 450-452, since all four rows 444-446 and 450-452 have the same original source row 410 in table 402. Finally, no rows in table 432 have paths that originate in row 412 since row 412 does not produce any rows in table 428. Generation of the cross products between tables 328 and 430 is further tracked in one set of relationships 438 between tables 428 and 432 and in another set of relationships 440 between tables 430 and 432.

Figure 4D:
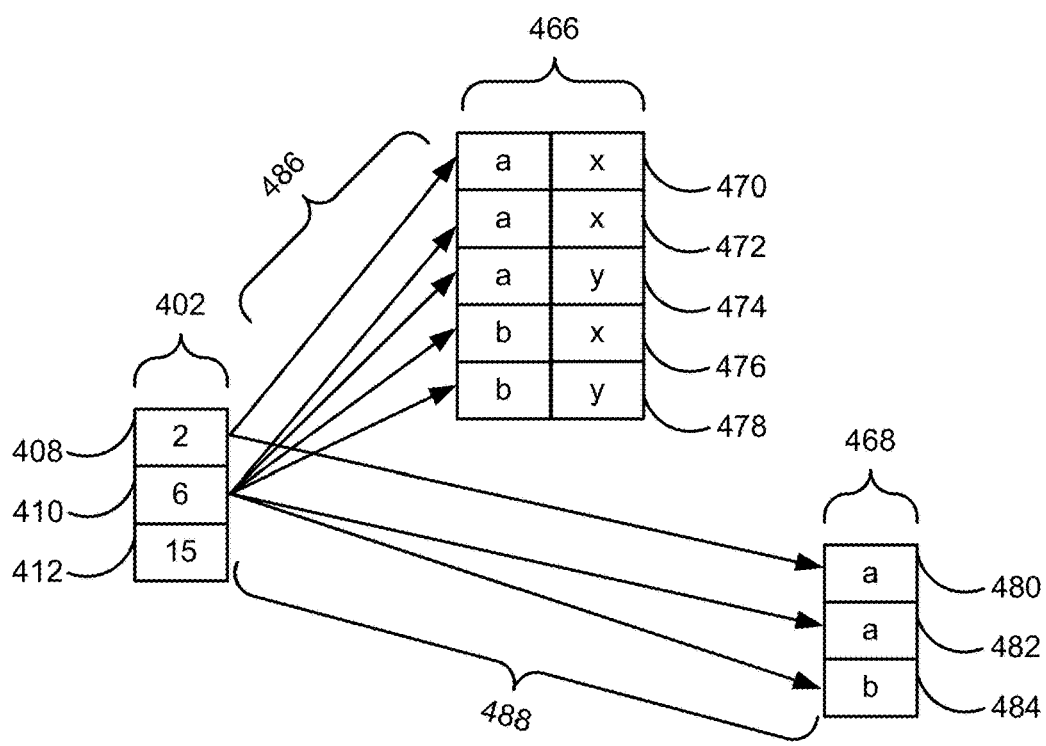
FIG. 4D shows an exemplary operation used in processing a path query of a graph database in accordance with the disclosed embodiments.

The unzip operation appends two tables into a single table. As shown in FIG. 4D, the source table 402 is used to generate five rows 470-478 of an intermediate table 466 with two columns. Relationships 486 between tables 402 and 466 indicate that row 470 is produced from row 408 and rows 472-478 are generated from row 410. Row 470 has values of "a" and "x" in the columns, and the next four rows 472-478 store the cross product of {"a", "b"} and {"x", "y"}. The unzip operation may be applied to the first column of table 466 to produce an output table 468 containing three rows 480-484. Row 480 stores the unique value of "a" from the column, which is generated from an origin in row 408 and the value of the column in row 470. Rows 482-484 store the unique values of "a" and "b" from the column, which are generated from a common origin in row 410 and the values of the column in rows 472-478.

Finally, the join operation produces a cross product of two sets of source rows followed by a comparison of equality between columns in the cross product. In other words, the join operation may be applied to the output of the zip operation to remove all rows that do not contain identical values in the corresponding columns. For example, the join operation may be used to evaluate queries involving connections in common between two members. First, an expand operation may be used to generate the first-degree connections of each member, and the zip operation may be used to calculate the cross product of the first-degree connections of both members. Thus, if one member has M first-degree connections and the other member has N first-degree connections, the cross product table may have M*N rows and two columns; one column stores first-degree connections of one member, and the other column stores first-degree connections of the other member. The join operation then filters out all rows in the cross product table that do not have identical values in both columns, thereby producing a final result that contains first-degree connections that are shared by both members.

As shown in FIG. 3, tables 328 in data structure 304 are additionally associated with a set of evaluation modes 336. During path query evaluation, evaluation apparatus 302 sets and/or changes the evaluation mode of each table to be conjunctive, disjunctive, or optional. Evaluation apparatus 302 then removes one or more rows 330 in tables 328 based on the corresponding evaluation modes 336 and/or relationships 332 connecting rows 330 across tables 328. For example, evaluation apparatus 302 may use evaluation modes 336 and relationships 332 to propagate filtering of rows 330 in one table to rows 330 in other tables that are connected to the filtered rows via relationships 332.

In particular, a destination row in a table is removed if any source rows connected to the destination row via relationships 332 have been removed. If the table is in the optional evaluation mode, the removal of the destination row does not cause a source row connected to the destination row to be deleted. If the table is in the disjunctive evaluation mode, all destination rows must be removed for a given source row to be removed; conversely, all source rows must be removed for a destination row to be removed. If the table is in the conjunctive evaluation mode, a given source row is removed if all destinations associated with the source in another table have been removed; conversely, a destination row is removed if any source rows have been removed.

Evaluation apparatus 302 also uses a set of constraints 324 to produce operations 322, enforce evaluation modes 336, and/or update data structure 304 during evaluation of queries 308. For example, constraints 324 may be used to track paths formed by relationships 332 between rows 330 of tables 328 in data structure 304 and propagate deletions of rows 330 according to evaluation modes 336. Each constraint may include a number of arguments and a variable that indicates if the constraint has been fulfilled. When all constraints have been satisfied, evaluation of the query may be complete.

In one or more embodiments, evaluation apparatus 302 uses constraints 324 to optimize declarative evaluation of queries 308 independently of the way queries 308 are written. For example, a query for employees that have worked at two specified companies may be evaluated in three different ways: looking up past and present employees of the first company and removing employees that have not also worked at the second company, looking up past and present employees of the second company and removing employees that have not also worked at the first company, and looking up past and present employees of both companies and calculating the intersection of the two sets of employees. Evaluation apparatus 302 may select an optimal method for evaluating the query based on costs associated with the operations, which can be determined quickly by performing constant-time lookups in index 314 and retrieving the size of the corresponding intermediate result sets (i.e., number of employees at each company) from index 314. In contrast, a conventional database with a relational data model may generate intermediate results by reading one or more streams from disk, which is typically slower than random access and precludes optimization of queries based on the costs of the corresponding operations.

In one or more embodiments, evaluation apparatus 302 includes representations of constraints 324 in data structure 304 to facilitate query evaluation according to constraints 324. For example, each constraint may include one or more 1x0 tables 328 (i.e., tables with one row and zero columns) in data structure 304. Each of these tables holds no data and is used to connect other tables 328 and/or apply certain evaluation modes 336 to the other tables 328.

In one or more embodiments, constraints 324 include an edge constraint, a union constraint, an optional constraint, and an aggregation constraint. The edge constraint requires an edge associated with three variables. For example, the edge constraint may indicate that an edge is required for specific values and/or a given combination of a subject, predicate, and object in graph database 200. In turn, the edge constraint may have the following representation:

Edge(s0, v0, v1, v2) In the above expression, "s0" represents a 1x0 table in data structure 304, and "v0," "v1," and "v2" represent three linkages required by the edge.

The union constraint links one value to two or more other values. For example, the union constraint may be used to track variables on different sides of disjunctions and/or alternations during evaluation of queries 308.

The optional constraint indicates that one or more attributes (e.g., rows, columns, tables, etc.) associated with evaluation of queries 308 are to be evaluated in the optional evaluation mode. For example, the optional constraint may be applied to nodes 316, edges 318, predicates 320, tables 328, and/or other constraints 324.

Finally, the aggregation constraint is used to perform an aggregation during processing of a query. As mentioned above, the aggregation may be performed using the reduce operation to generate a sum, count, minimum, maximum, average, median, percentile, and/or other metric or statistic from a set of input rows 330. In turn, the aggregation constraint may ensure that the set of input rows is both complete and will not subsequently be filtered or reduced before the aggregation is applied to the input rows.

For example, the aggregation constraint may be used with a query that counts the number of edges associated with a given subject represented by "v0" and predicate represented by "v1" (e.g., the number of first-degree connections of a member in a social network). The query may produce the following constraints:

Optional(s0, s1)
Optional(s0, v0, s1, v3)
Optional(s0, v1, s1, v4)
Edge(s1, v3, v4, v5)
Count(s0, v2, [v5], [v0, v1], s1)

The first constraint is an optional constraint that is applied to two 1x0 tables represented by "s0" and "s1." The second and third constraints structure the query with respect to "s0," "s1," the subject "v0," the predicate "v1," and two additional variables represented by "v3" and "v4." The fourth constraint is an edge constraint that requires an edge represented by "v3," "v4," and "v5." Finally, the fifth constraint is an aggregation constraint that shares the optional "s0" constraint, stores the count in "v2," counts the number of rows represented by "v5," groups the edges by "v0" and "v1," and depends on the "s1" constraint.

The operation of evaluation apparatus 302 using operations 322, constraints 324, and/or data structure 304 may be illustrated using the following exemplary query:

Expr1(v1, v2, v3):- Edge(v1, v3, v2). % ES (1, 0)
Expr1(v1, v2, v3):- Edge(v2, v3, v1). % E0
Expr1("m1", v4, v5), Edge(v4, v5, _) ?

The exemplary query above uses the value of "m1" as a subject or an object to materialize an edge, and then uses the predicate and the other side of the materialized edge (i.e., an object or a subject) to materialize a different set of edges.

The exemplary query above may be converted into the following set of constraints:

Literal(s1, v1, "m1")
Union(v1, [v2, v4])
Union(v8, [v4, v6])
Union(v9, [v3, v7])
Union(s1, [s2, s3])
Edge(s2, v2, v3, v4)
Edge(s3, v6, v7, v5)

The first constraint indicates that the literal value of "m1" is to be found in graph database 200 and assigns a variable of "s1" to a 1x0 table to track the position and/or evaluation of the first constraint within data structure 304. The second through fifth constraints are union constraints that link "v1" to "v2" and "v4," "v8" to "v4" and "v6," "v9" to "v3" and "v7," and "s1" to two additional constraints represented by "s2" and "s3." The last two constraints are edge constraints that depend on "s2" and "s3" and materialize the edge that is returned in a result of the query.

The operation of evaluation apparatus 302 using operations 322, constraints 324, and/or data structure 304 may further be illustrated using another exemplary query of:

Edge(a, a, _)?

The exemplary query above may be converted into the following constraint:

Edge(s0, v0, v0, v1)

In other words, the query may be used to identify all edges in graph database 200 that contain the same subject and predicate (or predicate and object).

To optimize processing of the query, evaluation apparatus 302 may perform constant-time lookups of index 314 to retrieve illustrative costs of 12, 4, and 6 for materializing the corresponding subject, predicate, and object values. The costs may be stored in three tables 328 of data structure 304 with the following representations:

% Lookup_→S
Hydra Node 1: 1x2, Sources [0]
Row 0: Values [Branches 0xF, Cost 12], Source Offsets [0]
% Lookup_→P
Hydra Node 2: 1x2, Sources [0]
Row 0: Values [Branches 0xF, Cost 4], Source Offsets [0]
% Lookup_→O
Hydra Node 3: 1x2, Sources [0]
Row 0: Values [Branches 0xF, Cost 6], Source Offsets [0]

In the above representations, the subject lookup is stored in a first 1x2 table ("Hydra Node 1"), with the cost of 12 found in the second column of the only row. The predicate lookup is stored in a second 1x2 table ("Hydra Node 2"), with the cost of 4 found in the second column of the only row. The object lookup is stored in a third 1x2 table ("Hydra Node 3"), with the cost of 6 found in the second column of the only row. All three tables have "sources" indexed by 0, indicating that the tables are populated with data that is retrieved directly from log 312 and/or index 314 instead of other tables 328 in data structure 304.

Because the predicate has the lowest cost, evaluation apparatus 302 materializes the predicate values in a fourth table with the following representation:

% Materialize_→P
Hydra Node 4: 4x1, Sources [0]
Row 0: Values [P 1], Source Offsets [0]
Row 1: Values [P 13], Source Offsets [0]
Row 2: Values [P 32], Source Offsets [0]
Row 3: Values [P 54], Source Offsets [0]

In the above representation, the table has four rows and one column, with the rows storing materialized values of 1, 13, 32 and 54. Because the fourth table is generated from data in log 312 and/or index 314, the table also has "sources" indexed by 0 instead of an index of another table in data structure 304.

Evaluation apparatus 302 then uses the materialized values from the fourth table to perform lookups of index 314 that retrieve the costs of materializing edges using the materialized values as subjects or predicates. Evaluation apparatus 302 stores the costs in two additional tables 328 of data structure 304 with the following representations:

% Lookup S→EPO
Hydra Node 5: 4x2, Sources [4]
Row 0: Values [Branches 0xF, Cost 2], Source Offsets [0]
Row 1: Values [Branches 0xF, Cost 2], Source Offsets [1]
Row 2: Values [Branches 0xF, Cost 2], Source Offsets [2]
Row 3: Values [Branches 0xF, Cost 2], Source Offsets [3]
% Lookup P→ESO
Hydra Node 6: 4x2, Sources [4]
Row 0: Values [Branches 0xF, Cost 4], Source Offsets [0]
Row 1: Values [Branches 0xF, Cost 4], Source Offsets [1]
Row 2: Values [Branches 0xF, Cost 8], Source Offsets [2]
Row 3: Values [Branches 0xF, Cost 8], Source Offsets [3]

In the above representations, both tables accept rows from the fourth table ("Sources [4]") as input and generate four rows as output. The first table contains costs associated with materializing edges using the values from the fourth table as subjects, and the second table contains costs associated with materializing edges using the values from the fourth table as predicates. Each row of the fifth and sixth tables stores the cost of materializing edges for a corresponding row from the fourth table. The "source offsets" represent relationships 332 between rows of the input and output tables, which indicate that each row in the fourth table (indexed from 0 to 3) is used to generate a corresponding row with the same index in the fifth and sixth tables.

Because the total cost of materializing edges using rows in the fourth table as subjects (8) is lower than the total cost of materializing edges using rows in the fourth table as predicates (24), rows in the fourth table are used as subjects to materialize edges in a seventh table of data structure 304 with the following representation:

% Materialize S→EPO
Hydra Node 7: 8x3, Sources [5]
Row 0: Values [E 83, P 321, O 76], Source Offsets [0]
Row 1: Values [E 87, P 54, O 77], Source Offsets [0]
Row 2: Values [E 91, P 32, O 78], Source Offsets [1]
Row 3: Values [E 95, P 54, O 79], Source Offsets [1]
Row 4: Values [E 99, P 32, O 80], Source Offsets [2]
Row 5: Values [E 103, P 54, O 81], Source Offsets [2]
Row 6: Values [E 107, P 32, O 82], Source Offsets [3]
Row 7: Values [E 111, P 54, O 83], Source Offsets [3]

In the above representation, the fifth table containing costs of materializing the edges is used as input for the materialization. In turn, materialized edges from the four rows of the input table are stored in eight rows of the seventh table, with each input row from the fifth table generating two output rows in the seventh table. Each row contains three columns identifying the edge, predicate, and object associated with a given subject value from the fourth table.

Finally, predicates of the materialized edges from the seventh table are joined with the original materialized values from the fourth table to obtain a final result of the query, which is stored in an eighth table with the following representation:
% Join 4, 7 relative to 4
Hydra Node 8: 2x0, Sources [4, 7]
Row 0: Values [ ], Source Offsets [2, 4]
Row 1: Values [ ], Source Offsets [3, 7]

The above representation indicates that the eighth table has two rows and zero columns. The first row is created from joining the row indexed by 2 from the fourth table and the row indexed by 4 from the $7^{th}$ table, both of which contain the same predicate value of 32. The second row is created from joining the row indexed by 3 from the fourth table and the row indexed by 7 from the seventh table, both of which contain the same predicate value of 54. Thus, the final result of the query may indicate that two edges have the same subject and predicate values. Moreover, values of "sources" and "source offsets" in the eighth table may be used to optionally retrieve the values of the edges from the fourth and seventh tables and return the values in response to the query.

The final join operation may further be expedited by setting the evaluation mode of all tables to be conjunctive. As a result, all rows in the seventh table may be removed from the join operation except for the rows indexed by 4 and 7, and all rows in the fourth table may be removed from the join operation except for the rows indexed by 2 and 3.

Those skilled in the art will appreciate that the system of FIG. 3 may be implemented in a variety of ways. First, evaluation apparatus 302, graph database 200, and/or source of truth 334 may be provided by a single physical machine, multiple computer systems, one or more virtual machines, a grid, one or more databases, one or more filesystems, and/or a cloud computing system. Evaluation apparatus 302 and graph database 200 may additionally be implemented together and/or separately by one or more hardware and/or software components and/or layers.

Second, the functionality of evaluation apparatus 302 may be used with other types of databases and/or data. For example, the evaluation apparatus may be configured to perform path-based evaluation of queries in other systems that support flexible schemas and/or querying.

Figure 5:
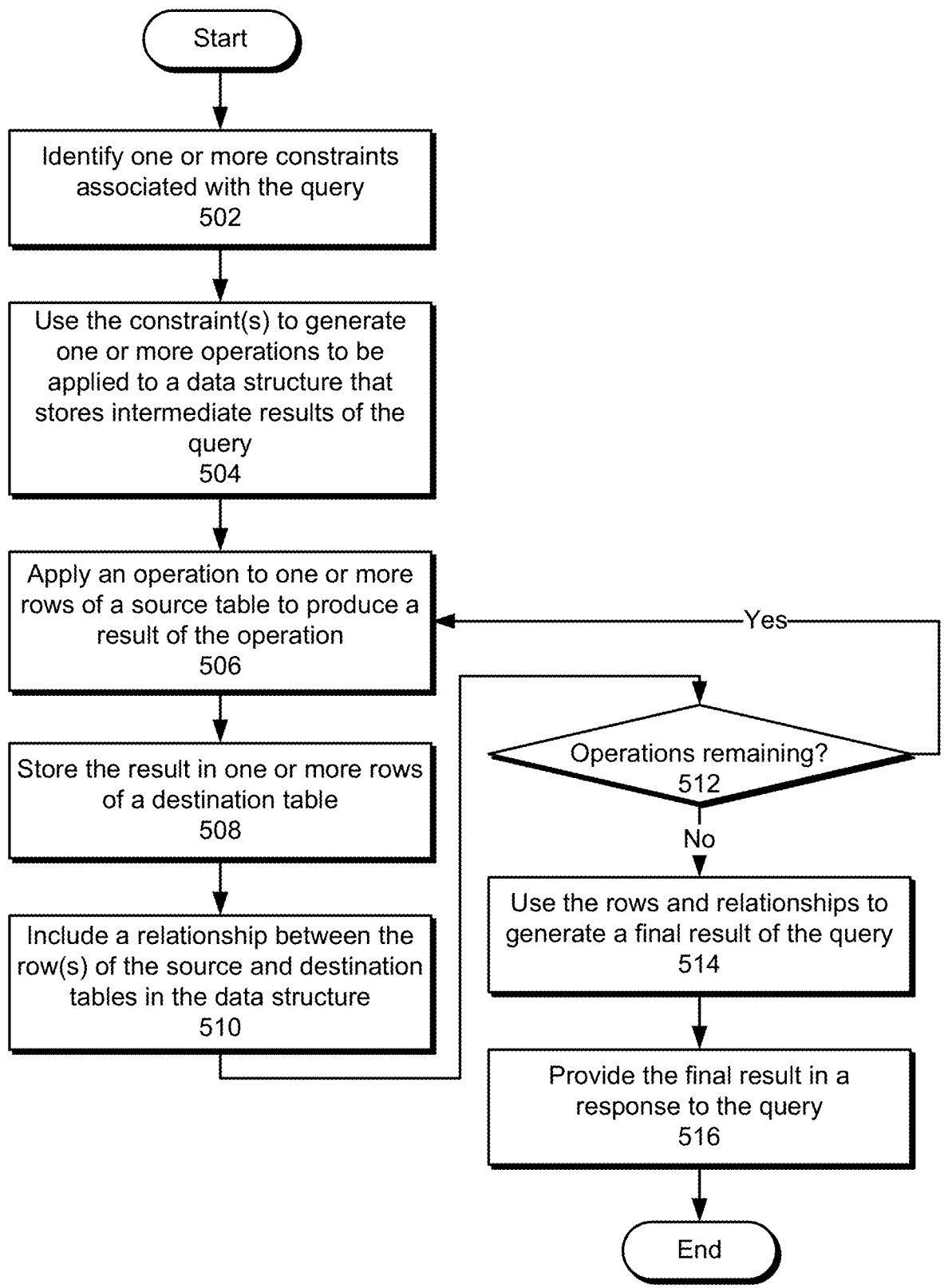
FIG. 5 shows a flowchart illustrating the processing of a query of a graph database in accordance with the disclosed embodiments.

FIG. 5 shows a flowchart illustrating the processing of a query of a graph database in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the technique.

Initially, one or more constraints associated with the query are identified (operation 502) and used to generate one or more operations to be applied to a data structure that stores intermediate results of the query (operation 504). The data structure includes rows in a set of tables. The constraints include an edge constraint that requires an edge associated with three variables, a union constraint that links one value to two or more other values, an optional constraint to be applied to a portion of the query, and/or an aggregation constraint for performing an aggregation within the query.

Next, the operations are applied to existing rows in the structure to generate additional rows in additional tables of the structure. In particular, a given operation is applied to one or more rows of a source table to produce a result of the operation (operation 506), and the result is stored in one or more rows of a destination table (operation 508). For example, the operation may include an expand operation that expands one row from the source table into multiple rows in the destination table, a reduce operation that aggregates multiple rows from the source table into a single row in the destination table, a zip operation that produces a cross product from two sets of source rows, an unzip operation that appends two tables into a single table, and/or a join operation that produces a cross product of two sets of source rows followed by a comparison of equality between columns in the cross product.

After the operation has completed, a relationship between rows of the source and destination tables is included in the data structure (operation 510). In other words, the relationship may track and connect inputs and outputs associated with the operation.

Operations 506-510 may be repeated for remaining operations (operation 512) to be applied to the data structure. For example, operations may be applied to rows of existing tables to generate additional rows in new tables of the data structure and form new relationships between the existing tables and new tables until the data structure contains a path representing a final result of the query.

While the operations are used to generate intermediate results that are stored in the data structure, each table in the data structure may be associated with an evaluation mode that is set to disjunctive, conjunctive, or optional. Removal of rows may then be propagated across the tables based on the evaluation mode of each table and relationships between rows of the tables. For example, one or more operations may be used to filter rows from one or more tables. As a result, a destination row in a table is removed if any source rows connected to the destination row have been removed. If the table is in the optional evaluation mode, the removal of the destination row does not cause the source row to be deleted. If the table is in the disjunctive evaluation mode, all destination rows must be removed for a given source row to be removed; conversely, all source rows must be removed for a destination row to be removed. If the table is in the conjunctive evaluation mode, a given source row is removed if all destinations associated with the source in another table have been removed; conversely, a destination row is removed if any source rows have been removed.

After all operations and row removals have been applied to the data structure, the final result is generated using the rows and relationships (operation 514) of the data structure and provided in a response to the query (operation 516). For example, the final result may include rows from one or more tables of the data structure.

Figure 6:
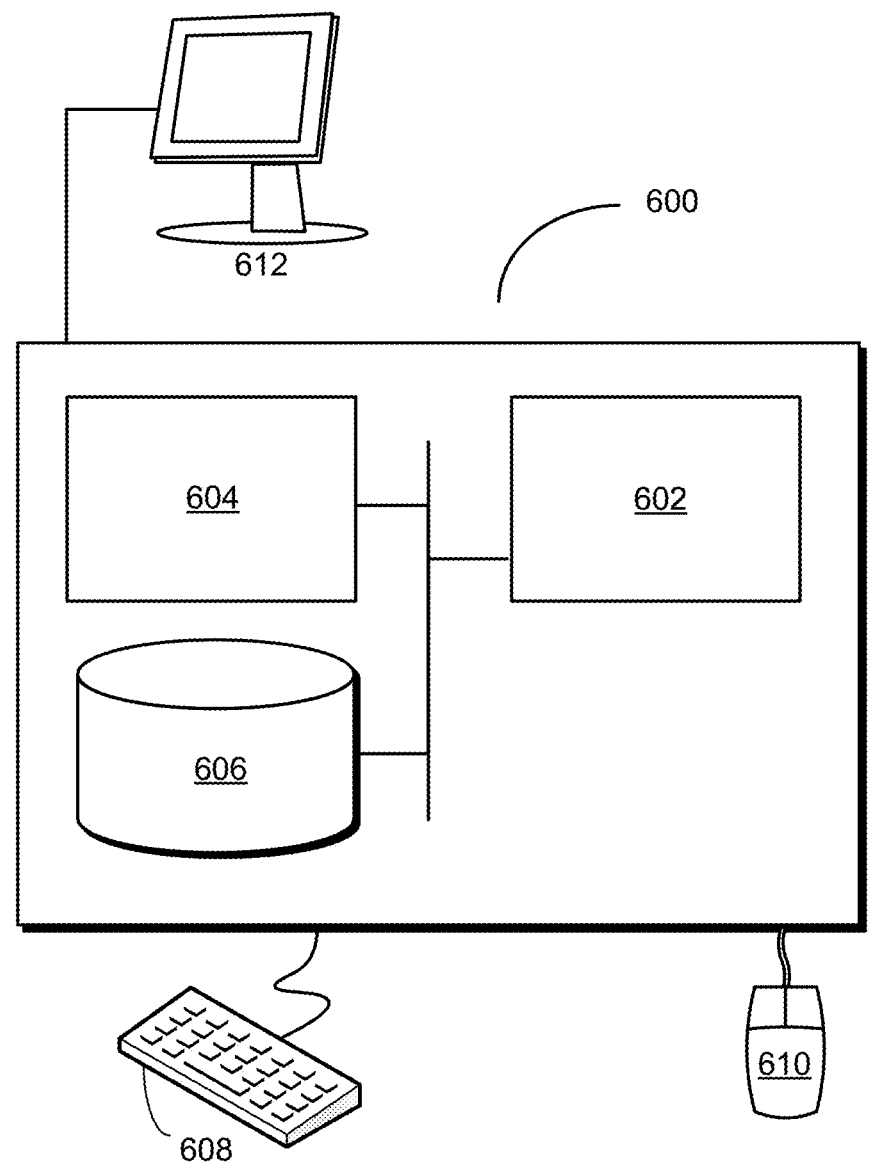
FIG. 6 shows a computer system in accordance with the disclosed embodiments.

FIG. 6 shows a computer system 600 in accordance with an embodiment. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for processing queries of a graph database. The system includes an evaluation apparatus that stores intermediate results of a query in a structure containing rows in a set of tables. Next, the evaluation apparatus applies one or more operations to existing rows in the structure to generate additional rows in additional tables of the structure. The evaluation apparatus also tracks inputs and outputs associated with the one or more operations in a set of relationships between rows of different tables in the structure. Finally, the evaluation apparatus uses the rows and the set of relationships to generate a final result of the query and provides the final result in a response to the query.

In addition, one or more components of computer system 600 may be remotely located and connected to the other components over a network. Portions of the present embodiments (e.g., evaluation apparatus, graph database, etc.) may also be located on different nodes of a distributed system that implements the embodiments. For example, the present embodiments may be implemented using a cloud computing system that performs path query evaluation in a remote graph database.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A system comprising:
one or more processors; and
memory storing instructions that, when executed by the one or more processors, cause the system to:
execute a set of processes for processing queries of a graph database storing a graph, wherein the graph comprises a set of nodes, a set of edges between pairs of nodes in the set of nodes, and a set of predicates; and
when a query of the graph database is received, using one or more of the set of processes to process the query by:
storing intermediate results of the query in a structure comprising rows in a set of tables;
applying one or more operations to existing rows in the structure to generate additional rows in additional tables of the structure;
wherein the one or more operations comprise at least one of:
an expand operation that expands one row from a first table into multiple rows in a second table;
a reduce operation that aggregates multiple rows from a third table into a single row in a fourth table;
a zip operation that produces a first cross product from two sets of source rows;
an unzip operation that appends two tables into a single table; or
a join operation that produces a second cross product of two sets of source rows followed by a comparison of equality between columns in the second cross product;
tracking inputs and outputs associated with the one or more operations in a set of relationships between rows of different tables in the structure;
using the rows and the set of relationships to generate a final result of the query; and
providing the final result in a response to the query.

2. The system of claim 1, wherein the memory further stores instructions that, when executed by the one or more processors, cause the system to:
identify one or more constraints associated with the query; and
use the one or more constraints to generate the one or more operations.

3. The system of claim 2, wherein the one or more constraints comprise an edge constraint that requires an edge associated with three variables.

4. The system of claim 2, wherein the one or more constraints comprise a union constraint that links one value to two or more other values.

5. The system of claim 2, wherein the one or more constraints comprise an optional constraint to be applied to a portion of the query.

6. The system of claim 2, wherein the one or more constraints comprise an aggregation constraint for performing an aggregation within the query.

7. The system of claim 1, wherein the one or more operations comprise the expand operation that expands one row from the first table into multiple rows in the second table.

8. The system of claim 1, wherein the one or more operations comprise the reduce operation that aggregates multiple rows from the third table into the single row in the fourth table.

9. The system of claim 1, wherein the one or more operations comprise the zip operation that produces the first cross product from two sets of source rows.

10. The system of claim 1, wherein the one or more operations comprise the unzip operation that appends the two tables into the single table.

11. The system of claim 1, wherein the one or more operations comprise the join operation that produces the second cross product of the two sets of source rows followed by the comparison of equality between the columns in the second cross product.

12. The system of claim 1, wherein applying the one or more operations to the structure to generate the final result of the query comprises:
applying an operation to one or more rows of a source table in the structure to produce a result of the operation; and
storing the result in one or more additional rows of a destination table in the structure.

13. A system comprising:
one or more processors; and
memory storing instructions that, when executed by the one or more processors, cause the system to:
  execute a set of processes for processing queries of a graph database storing a graph, wherein the graph comprises a set of nodes, a set of edges between pairs of nodes in the set of nodes, and a set of predicates; and
  when a query of the graph database is received, using one or more of the set of processes to process the query by:
    storing intermediate results of the query in a structure comprising rows in a set of tables;
    applying one or more operations to existing rows in the structure to generate additional rows in additional tables of the structure;
    tracking inputs and outputs associated with the one or more operations in a set of relationships between rows of different tables in the structure;
    using the rows and the set of relationships to generate a final result of the query; and
    providing the final result in a response to the query;
  wherein applying the one or more operations to the structure comprises:
    for each table in the set of tables, setting an evaluation mode of the table to be disjunctive, conjunctive, or optional; and
    propagating removal of one or more of the rows across the set of tables based on the evaluation mode.

14. A method comprising:
executing a set of processes for processing queries of a graph database storing a graph, wherein the graph comprises a set of nodes, a set of edges between pairs of nodes in the set of nodes, and a set of predicates; and
when a query of the graph database is received, using one or more of the set of processes to process the query by:
  storing intermediate results of the query in a structure comprising rows in a set of tables;
  applying one or more operations to existing rows in the structure to generate additional rows in additional tables of the structure;
  wherein the one or more operations comprise at least one of:
    an expand operation that expands one row from a first table into multiple rows in a second table;
    a reduce operation that aggregates multiple rows from a third table into a single row in a fourth table;
    a zip operation that produces a first cross product from two sets of source rows;
    an unzip operation that appends two tables into a single table; or
    a join operation that produces a second cross product of two sets of source rows followed by a comparison of equality between columns in the second cross product;
  tracking inputs and outputs associated with the one or more operations in a set of relationships between rows of different tables in the structure;
  using the rows and the set of relationships to generate a final result of the query; and
  providing the final result in a response to the query.

15. The method of claim 14, further comprising:
identifying one or more constraints associated with the query; and
using the one or more constraints to generate the one or more operations.

16. The method of claim 15, wherein the one or more constraints comprise at least one of:
  an edge constraint that requires an edge associated with three variables;
  a union constraint that links one value to two or more other values;
  an optional constraint to be applied to a portion of the query; and
  an aggregation constraint for performing an aggregation within the query.

17. The method of claim 14, wherein the one or more operations comprise at least one of:
  the expand operation that expands one row from the first table into the multiple rows in the second table; or
  the reduce operation that aggregates the multiple rows from the third table into the single row in the fourth table.

18. The method of claim 14, wherein applying the one or more operations to the structure to generate the final result of the query comprises:
  applying an operation to one or more rows of a source table in the structure to produce a result of the operation; and
  storing the result in one or more additional rows of a destination table in the structure.

19. The method of claim 14, wherein applying the one or more operations to the structure to generate the final result of the query comprises:
  for each table in the set of tables, setting an evaluation mode of the table to be disjunctive, conjunctive, or optional; and
  propagating removal of one or more of the rows across the set of tables based on the evaluation mode.

20. The method of claim 14, wherein the one or more operations comprise at least one of:
  the zip operation that produces the first cross product from the two sets of source rows;
  the unzip operation that appends the two tables into the single table; or
  the join operation that produces the second cross product of the two sets of source rows followed by the comparison of equality between the columns in the second cross product.

* * * * *